(12) United States Patent
Balasubramanian et al.

(10) Patent No.: US 10,410,060 B2
(45) Date of Patent: Sep. 10, 2019

(54) GENERATING SYNTHESIS VIDEOS

(71) Applicant: Google LLC, Mountain View, CA (US)

(72) Inventors: Arvind Ganesh Balasubramanian, Fremont, CA (US); Arun Kumar Kandoor, San Jose, CA (US); Akhil Raju, Cupertino, CA (US)

(73) Assignee: Google LLC, Mountain View, CA (US)

( * ) Notice: Subject to any disclaimer, the term of this patent is extended or adjusted under 35 U.S.C. 154(b) by 137 days.

(21) Appl. No.: 15/842,371

(22) Filed: Dec. 14, 2017

(65) Prior Publication Data

US 2019/0188479 A1  Jun. 20, 2019

(51) Int. Cl.
| | | |
|---|---|---|
| *G06K 9/62* | (2006.01) | |
| *G06K 9/00* | (2006.01) | |
| *G06T 7/246* | (2017.01) | |
| *G06T 7/00* | (2017.01) | |
| *G06N 20/00* | (2019.01) | |

(52) U.S. Cl.
CPC ..... *G06K 9/00718* (2013.01); *G06K 9/00744* (2013.01); *G06K 9/00765* (2013.01); *G06N 20/00* (2019.01); *G06T 7/0002* (2013.01); *G06T 7/251* (2017.01); *G06T 2207/10016* (2013.01)

(58) Field of Classification Search
CPC ........... G06K 9/00718; G06K 9/00744; G06K 9/00765; G06N 20/00; G06T 2207/10016; G06Q 50/01; H04N 21/23418
USPC ....................................................... 382/159
See application file for complete search history.

(56) References Cited

U.S. PATENT DOCUMENTS

| | | | | |
|---|---|---|---|---|
| 7,471,292 B2* | 12/2008 | Li | ............... | G06T 15/20 345/419 |
| 8,103,107 B2* | 1/2012 | Yamamoto | ............ | G06F 16/739 382/206 |
| 9,478,056 B2* | 10/2016 | James | ............... | G06F 16/51 |
| 9,967,457 B1* | 5/2018 | Matias | ............... | G11B 27/10 |
| 2008/0193101 A1* | 8/2008 | Agnihotri | ............. | G06F 16/735 386/290 |
| 2018/0249200 A1* | 8/2018 | Wang | ................. | G06K 9/00302 |

OTHER PUBLICATIONS

Ravi et al., "Semantic Video Trailers," arXiv1609.01819v1, Sep. 7, 2016, 9 pages.
Vasudevan et al. "Query-adaptive Video Summarization via Quality-aware Relevance Estimation," arXiv 1705.00581v1, May 1, 2017, 10 pages.

* cited by examiner

*Primary Examiner* — Charlotte M Baker
(74) *Attorney, Agent, or Firm* — Fish & Richardson P.C.

(57) ABSTRACT

Methods, systems, and apparatus, including computer programs encoded on a computer storage medium, for generating synthesis videos. In one aspect, a method comprises identifying one or more topics for generation of a synthesis video. Videos are identified that are determined to be relevant to one or more of the identified topics. Video segments are extracted from one or more of the identified videos. For each of the video segments, a segment level score and a video level score are determined. A composite score for the video segment is determined by combining the segment level score and the video level score for the video segment. Video segments are selected for inclusion in the synthesis video based on the composite scores for the video segments. A synthesis video is generated by combining the selected video segments.

20 Claims, 5 Drawing Sheets

GENERATING SYNTHESIS VIDEOS

BACKGROUND

This specification relates to generating synthesis videos. A synthesis video may be a composite video generated from segments of different videos. A synthesis video may provide an overview of one or more topics.

Generating a synthesis video may involve machine learning models. Machine learning models receive an input and generate an output, e.g., a predicted output, based on the received input. Some machine learning models are parametric models and generate the output based on the received input and on values of the parameters of the model.

SUMMARY

This specification describes a system implemented as computer programs on one or more computers in one or more locations that generates synthesis videos.

According to a first aspect there is provided a method for generating synthesis videos, the method comprising: identifying one or more topics for generation of a synthesis video; identifying videos, wherein each identified video is determined to be relevant to one or more of the identified topics; extracting video segments from one or more of the identified videos, wherein each video segment is a proper subset of a video from which the video segment is extracted; for each of the video segments: determining a segment level score for the video segment, wherein the segment level score is determined based on properties of the video segment; determining a video level score for the video segment, wherein the video level score is determined based on properties of the video from which the video segment was extracted; combining the segment level score and the video level score to determine a composite score for the video segment; selecting video segments for inclusion in the synthesis video based on the composite scores for the video segments; generating the synthesis video by combining the selected video segments.

In some implementations, selecting the video segments includes an optimization procedure, comprising: generating sets of two or more of the video segments; and for each set of video segments, generating a cumulative measure of composite score based on the composite scores of the video segments that belong to the set of the video segments.

In some implementations, the optimization procedure comprises selecting a set of video segments according to a set of constraints, the constraints including one or more of: a maximum duration constraint, specifying an upper bound on a sum of durations of the selected set of video segments; a diversity constraint, specifying an upper bound on how many of the selected set of video segments are relevant to any particular identified topic.

In some implementations, extracting a video segment from a video comprises: processing frames of the video to determine a relevance of each frame of the video to each of the identified topics; identifying sequences of consecutive frames that are each relevant to an identified topic.

In some implementations, identifying one or more topics comprises: receiving one or more first topics; and identifying one or more second topics, wherein each identified second topic is determined to be related to one or more of the first topics.

In some implementations, a second topic is determined to be related to a first topic based on at least a frequency of search queries including the first topic and the second topic.

In some implementations, a second topic is determined to be related to a first topic based on at least a frequency that the first topic and the second topic jointly appear on web pages.

In some implementations, the segment level score of a video segment is determined based on at least one or more of: a visual quality score of the video segment; a probability that the video segment is a slideshow; and a relevance score of the video segment to an identified topic.

In some implementations, the probability that the video segment is a slideshow is determined based on: extracting motion features of the video segment; providing the extracted motion features to a machine learning model that processes the extracted motion features to generate a probability that the video segment is a slideshow.

In some implementations, the motion features of the video segment are optical flow features.

In some implementations, the video level score of a video segment is determined based on at least one or more of: a search results score of the video from which the video segment was extracted; a resolution of the video from which the video segment was extracted.

In some implementations, the method further comprises determining that each of the identified topics is associated with a popularity score that is at least as great as a minimum significance threshold.

In some implementations, the popularity score of a topic is determined based on a frequency of search queries including the topic.

In some implementations, the identified topics are relevant to a search query; and the generated synthesis video is displayed on a search results page.

In some implementations, combining the segment level score and the video level score to determine a composite score for the video segment comprises: combining the segment level score and the video level score by a weighted linear combination.

According to a second aspect there is provided a second method for generating synthesis videos, the second method comprising: in response to receiving an input comprising one or more topics, retrieving, by a computing system, one or more videos, wherein each of the one or more videos is determine to be relevant to one of the one or more topics; extracting, by the computing system, a plurality of video segments from the one or more retrieved videos, wherein each of the extracted video segments is determined to include content relating to one of the one or more topics; combining, by the computing system, at least two of the extracted video segments to generate an output video file; and outputting, by the computing system, the generated output video file.

In some implementations, the second method further comprises: determining, by the computing system, one or more sub-topics based on the one or more topics; wherein the one or more videos are retrieved based on the one or more topics and the one or more determined sub-topics, and wherein each of the extracted video segments includes content relating to at least one of the one or more sub-topics.

In some implementations, the second method further comprises: determining, by the computing system, a segment score for each of the extracted video segments based on the properties of each video segment; and selecting, by the computing system, at least two of the extracted video segments for combination to generate the output video file, based at least in part of the segment score determined for each extracted video segment.

In some implementations, the segment score for each extracted video segment is determined based on at least one of: a visual quality score of the extracted video segment; and a confidence score indicating a likelihood that the video segment includes content relating to at least one of the one or more sub-topics.

In some implementations, the second method further comprises: determining, by the computing system, a video score for each of the extracted video segments based on the properties of the retrieved video from which the video segment is extracted; wherein selecting the extracted video segments for combination is further based at least in part on the video score determined for each extracted video segment.

In some implementations, the video score for each extracted video segment is determined based on at least one of: a popularity score of the retrieved video from which the video segment is extracted; a search result score of the retrieved video from which the video segment is extracted; a relevance score of the retrieved video from which the video segment is extracted, indicating a relevance of the video to the one or more topics; and a resolution of the retrieved video from which the video segment is extracted.

In some implementations, selecting the extracted video segments for combination is further based at least in part on one or more constraints.

In some implementations, the one or more constraints include one or more of a maximum length for the generated output video, a maximum number of extracted video segments, and a diversity constraint limiting the number of extracted video segments which include content relating to the same topic.

The above aspects can be implemented in any convenient form. For example, aspects and implementations may be implemented by appropriate computer programs which may be carried on appropriate carrier media which may be tangible carrier media (e.g. disks) or intangible carrier media (e.g. communications signals). Aspects may also be implemented using suitable apparatus which may take the form of programmable computers running computer programs.

Particular embodiments of the subject matter described in this specification can be implemented so as to realize one or more of the following advantages. Synthesis videos generated by the system as described in this specification can provide a visual overview of one or more topics that facilitates visual presentation of information in environments where textual presentation of information may be impractical, such as in virtual reality environments. Furthermore, synthesis videos that are relevant to a search query may be provided alongside search results responsive the search query, thereby providing search engine users with a rich information source relevant to the search query without requiring further exploration on the part of the user. These are improvements in the field of information management and presentation.

Synthesis videos generated by the system as described in this specification include video segments that are selected in accordance with an optimization process. The optimization process selects a set of video segments that are associated with a high cumulative measure of composite score, thereby causing the selected video segments to have desirable properties such as high measures of visual quality. The optimization process also selects the set of video segments based on a set of constraints, such as a constraint requiring that the duration of the synthesis video is not more than a predetermined maximum duration. By selecting video segments to be included in the synthesis video in accordance with an optimization process, the system as described in this specification may generate synthesis videos of a higher quality (e.g., having a more appropriate length and/or a higher visual quality) than synthesis videos generated by systems that do not select video segments in accordance with an optimization process. Moreover, the optimization process helps ensure that segments that are consistent in content properties are selected for a composite video according to a lightweight computation, which reduces training complexity. This, in turn, reduces the amount of computational resources required to generate a composite video.

Moreover, synthesis videos generated by the system as described in this specification may promote more efficient use of computational resources (e.g., computing power) by reducing video accesses, where a video access is a request for presentation of a video that is processed by a server. In particular, a synthesis video relevant to a particular set of one or more topics may be generated and presented to users requesting information related to the particular set of topics and in doing so obviate the need for users to individually access multiple videos relevant to the particular set of topics, thereby reducing video accesses. This is an improvement in the field of resource allocation and management.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system for generating synthesis videos. A synthesis video is a video composed of video segments extracted from one or more videos. A synthesis video may provide an overview of one or more topics by including video segments relevant to the topics. For example, a synthesis video related to the topic of France may include video segments relevant to Paris, the Louvre, and/or the Cannes Film Festival, amongst others. The system generates a synthesis video for one or more topics by identifying videos relevant to the topics, extracting video segments from the identified videos, scoring the segments, using an optimization process to select video segments to be included in the synthesis video based on the segment scores, and combining the selected video segments into a synthesis video. In some cases, synthesis videos may be generated for multiple different topics and stored. A stored synthesis video may be presented alongside search results responsive to a search query including the topics of the stored synthesis video. A stored synthesis video may be presented in an interest feed of a user (e.g., on a social media platform or on a search application) based on determining that the topics of the synthesis video may be of interest to the user. Topics may be determined to be of interest to a user based on previous activity of the user (e.g., previous activity on social media platforms or search applications). Synthesis videos may be used to present information in environments where textual presentation of information is impractical, such as virtual reality environments.

Figure 1A:
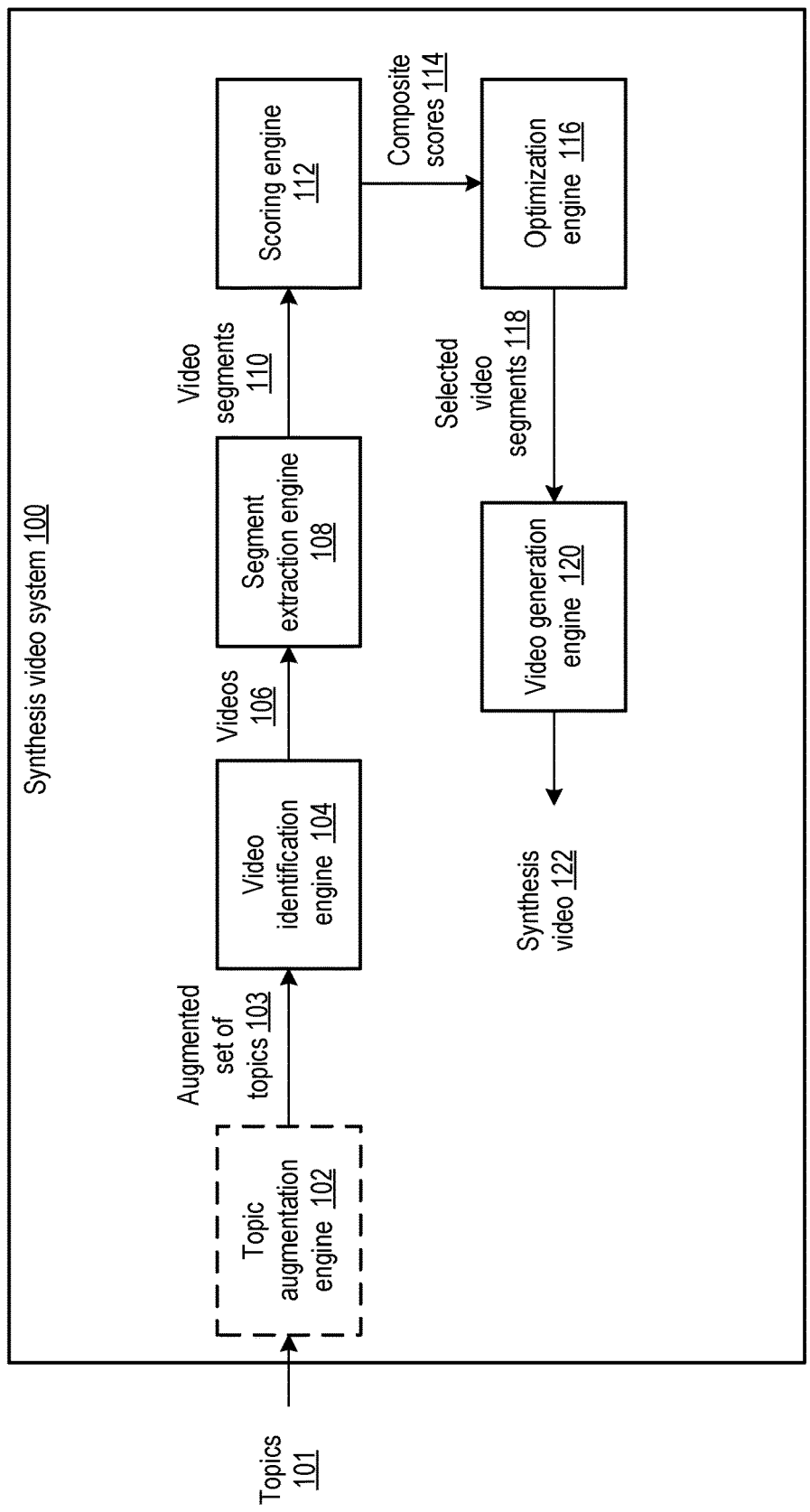
FIG. 1A is an illustration of an example synthesis video system.

FIG. 1A is an illustration of an example synthesis video system 100. The synthesis video system 100 is an example of a system implemented as computer programs on one or more computers in one or more locations in which the systems, components, and techniques described below are implemented.

The system 100 is configured to receive a set of one or more topics 101 and to generate a synthesis video 122 based on the topics 101. The topics 101 may include geographic locations (e.g., Paris), types of objects (e.g., cars), people (e.g., Winston Churchill), historical periods (e.g., the medieval ages), historical events (e.g., World War II), or any other category of information.

In some implementations, the system 100 provides the topics 101 as input to a topic augmentation engine 102 that is configured to receive the topics 101 and to generate as output an augmented set of topics 103. The augmented set of topics 103 may include the topics 101 and one or more additional topics that are determined by the topic augmentation engine 102 to be related to one or more of the topics 101. Any appropriate topic expansion and/or topic identification process can be used to generate the augmented set of topics 103. Examples include keyword expansion processes, directed graphs processes, semantic engines, and the like. For example, if the topics 101 include the topic "Paris", then the topic augmentation engine 102 may determine the topic "Eiffel Tower" to be related to the topic "Paris" and therefore include the topic "Eiffel Tower" in the augmented set of topics 103. In some implementations, the system 100 does not include a topic augmentation engine 102, and in these implementations the augmented set of topics 103 are considered (in this specification) to be the same as the topics 101.

The system 100 provides the augmented set of topics 103 to a video identification engine 104 that is configured to identify videos 106 that include content that is relevant to one or more topics of the augmented set of topics 103. A video can include content that is relevant to a topic if it includes visual, audio, or textual (e.g., in the form of subtitles) data that is semantically related to the topic. The video identification engine 104 may identify videos that include content that is relevant to a particular topic of the augmented set of topics 103 by performing a search using a search engine for videos that include content that is relevant to the particular topic. In general, each of the videos 106 may also include some content that is not relevant to any of the topics of the augmented set of topics 103. For example, if the augmented set of topics 103 includes the topic "baguettes", then the videos 106 may include a video depicting baguettes as well as other content (e.g., other bread types, bakers, etc.).

Any appropriate search system that can search videos using a set of one or more topics as search parameters can be used for the video identification engine 104. The video identification engine 104 may include, for example, a search process that searches metadata tags that describe the topics of tagged videos; image analysis techniques that identify objects in videos and determine the object names the topics to which the objects belong; and the like.

Figure 1B:
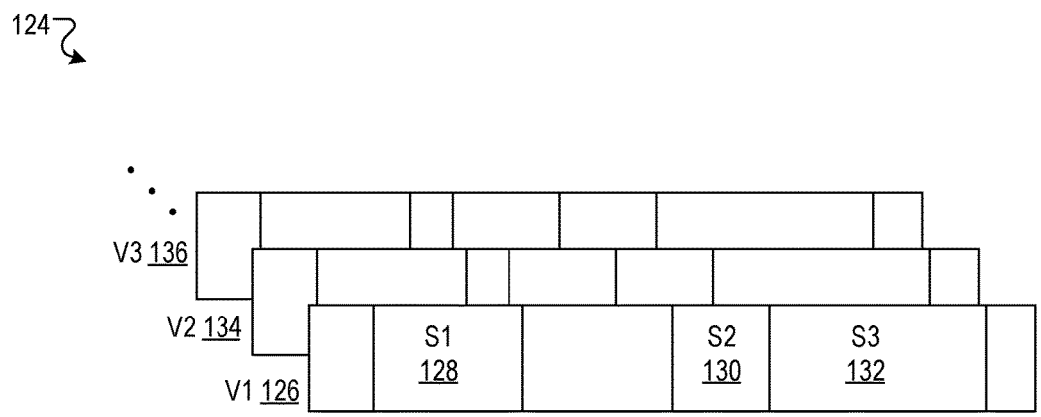
FIG. 1B is an illustration of example videos and video segments.

The system 100 provides the videos 106 as input to a segment extraction engine 108 that is configured to process the videos 106 to generate as output video segments 110 of the videos 106. A video segment refers a sequence of one or more consecutive frames of a video that is a proper subset of the video (i.e., that is not the whole video). Each of the video segments 110 are determined by the segment extraction engine 108 to be relevant to one or more topics of the augmented set of topics 103. For example, if the augmented set of topics 103 includes the topic "baguettes" and the videos 106 include a video depicting baguettes as well as other content (as in the previous example), then the segment extraction engine 108 may extract a video segment from the video such that the video segment includes one or more shots specifically depicting baguettes. FIG. 1B is an illustration of example videos and video segments. In particular, V1 126, V2 134, and V3 136 are videos, and S1 128, S2 130, and S3 132 are video segments extracted from the video V1 126 by the segment extraction engine 108.

The system 100 provides the video segments 110 as input to a scoring engine 112 that is configured to process the video segments 110 to generate as output a scalar-valued composite score 114 for each of the video segments 110. Specifically, for each of the video segments 110, the scoring engine 112 generates a scalar-valued segment level score, generates a scalar-valued video level score, and generates a scalar-valued composite score by combining the segment level score and the video level score.

The system 100 provides the composite scores 114 associated with the video segments 110 to an optimization engine 116 that is configured to identify a set of two or more video segments (i.e., the selected video segments 118) that are to be included in the synthesis video 122. In some cases, the optimization engine 116 determines the selected video segments 118 to be a set of two or more video segments that is associated with a maximum cumulative measure of composite score (from amongst other sets of two or more video segments) and that satisfies a set of one or more constraints on the selected video segments 118. The cumulative measure of composite score associated with a set of video segments may be determined to be the sum of the composite scores of each of the video segments of the set of video segments. The constraints on the selected video segments 118 may include a maximum duration constraint, specifying an upper bound on a sum of durations of the selected video segments 118 and/or a diversity constraint, specifying an upper bound on how many of the selected video segments 118 are relevant to any particular topic of the augmented set of topics 103.

The system 100 provides the selected video segments 118 to a video generation engine 120 that combines the selected video segments 118 to generate the synthesis video 122. An example process for generating a synthesis video is described with reference to FIG. 2.

Figure 2:
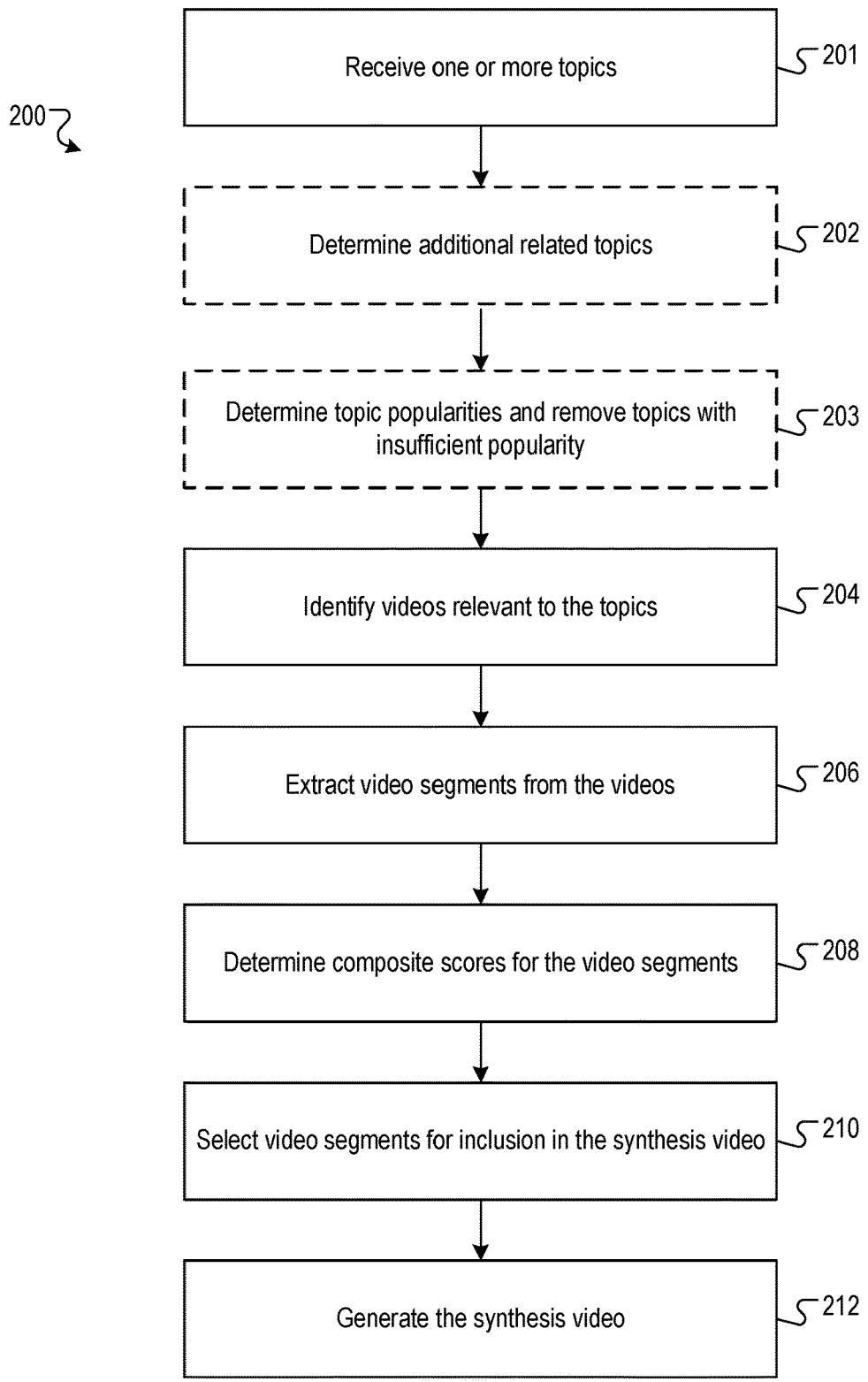
FIG. 2 is a flow diagram of an example process for generating a synthesis video.

FIG. 2 is a flow diagram of an example process for generating a synthesis video. For convenience, the process 200 will be described as being performed by a system of one or more computers located in one or more locations. For example, a synthesis video system, e.g., the synthesis video system 100 of FIG. 1, appropriately programmed in accordance with this specification, can perform the process 200.

The system receives one or more topics (201). The topics can be associated with any category of information. Examples of topics include geographic locations, types of objects, people, historical periods, and historical events, amongst others.

In some implementations, the system augments the number of topics by determining additional topics that are related to the received topics (202). In some cases, the system determines that a first topic and a second topic are related based on a frequency of search queries including the first topic and the second topic. In particular, the system may determine first topics and second topics that are frequently included in same search queries to be related. In some cases, the system determines a first topic and a second topic to be related based on a frequency that the first topic and the second topic jointly appear on webpages. For example, the system may determine a first topic to be related to a second topic if the second topic frequently appears on an informational webpage (e.g., an encyclopedia-type page) describing the first topic. In some cases, the system determines a first topic and a second topic to be related based on a connectedness of the first topic and the second topic in a graph database (e.g., the Google Knowledge Graph).

In some implementations, the system determines a popularity score of each of the topics and removes topics with insufficient popularity (203). In some cases, the system determines the popularity of a topic based on a frequency of search queries including the topic. In some cases, the system determines the popularity of a topic based on a measure of connectedness of the topic in a graph database (e.g., the Google Knowledge Graph). A topic may be determined to be insufficiently popular (and therefore removed) if the popularity of the topic is less than a pre-determined minimum popularity threshold. If fewer than a threshold number of topics remain after the system removes insufficiently popular topics, the system may decline to generate a synthesis video.

The system identifies videos that include content that is relevant to one or more of the topics (204). In some implementations, for each topic, the system identifies videos that include content that is relevant to the topic by performing a search using a search engine for videos that include content that is relevant to the topic. In these implementations, the search queries provided to the search engine may be given by the topics.

The system extracts video segments from the identified videos that are relevant to the topics. (206). In general, the system can use any appropriate automated method to extract video segments relevant to the topics, including image and video processing methods based on machine learning algorithms. In some implementations, the system processes the frames of a video to determine a relevance of each frame to each of the topics. The system may extract a video segment from a video in response to determining that each frame of the video segment has at least a minimum threshold relevance to at least one of the topics. In some implementations, the system processes sequences of multiple consecutive frames, along with audio and speech information associated with the sequences of frames. In these implementations, the system may extract a video segment from a video in response to determining that the sequence of multiple consecutive frames that compose the video segment, along with the associated audio and speech data, have at least a minimum threshold relevance to at least one of the topics. In some cases, the system does not extract any video segments from a video. For example, in some cases the system does not extract any video segments from a video in response to determining that the video does not include any video segments that are sufficiently relevant to any of the topics.

The system determines composite scores for the extracted video segments (208). An example process for determining a composite score for a video segment is described with reference to FIG. 3.

The system selects two or more video segments to be included in the synthesis video based on the composite scores generated for the video segments (210). In some cases, the system selects two or more video segments that are associated with a high cumulative measure of composite score (relative to other sets of two or more video segments) and that satisfies each constraint of a set of one or more constraints on the selected video segments. The cumulative measure of composite score associated with a set of video segments may be determined to be the sum of the composite scores of each of the video segments of the set of video segments.

In some implementations, the set of constraints on the selected video segments includes a maximum duration constraint, specifying an upper bound on a sum of durations of the selected video segments. In some implementations, the set of constraints on the selected video segments includes a diversity constraint, specifying an upper bound on how many of the selected video segments are relevant to any one of the topics. In some implementations, the diversity constraint may specify an upper bound on sum of the durations of the selected video segments that are relevant to any one of the topics. In some implementations, the diversity constraint may be a combination of the previously described diversity constraints. In general, the system may determine the relevance of a video segment to a topic using any appropriate automated method, including image and video processing methods based on machine learning algorithms. Imposing a diversity constraint may improve the synthesis video by ensuring that the video segments of the synthesis video are not overly focused on any particular topic.

In some implementations, the system generates multiple sets of two or more of the video segments, and for each generated set of video segments, generates the cumulative measure of composite score associated with the set of video segments and determines whether the set of video segments satisfies the constraints. The system may select the video segments to be included in the synthesis video as the generated set of video segments that has the highest associated cumulative measure of composite score from amongst the generated sets of video segments that satisfy the constraints. In some implementations, the system generates the multiple sets of two or more video segments in accordance with a combinatorial optimization strategy. For example, the system may generate the multiple sets of two or more video segments based on a combinatorial optimization strategy intended to provide a solution to the multi-choice knapsack problem.

The system generates the synthesis video (212). In general, the system generates the synthesis video by combining the video segments that are selected for inclusion in the synthesis video. Combining the selected video segments may include sequentially concatenating the frames of the selected video segments. Combining the selected video segments may include adjusting properties of each selected video segment to be consistent with the other selected video segments, including properties such as frame rate, resolution, and aspect ratio. Combining the selected video segments may include adding transitions (e.g., fade transitions) between the selected video segments. Combining the selected video segments may include determining an order of presentation of the selected video segments in the synthesis video. Determining an order of presentation of the selected video segments in the synthesis video may include determining a similarity measure between pairs of selected video segments. Pairs of selected video segments that are more similar to one another may be more likely to be adjacent to one another in the synthesis video than pairs of selected video segments that are less similar to one another.

Figure 3:
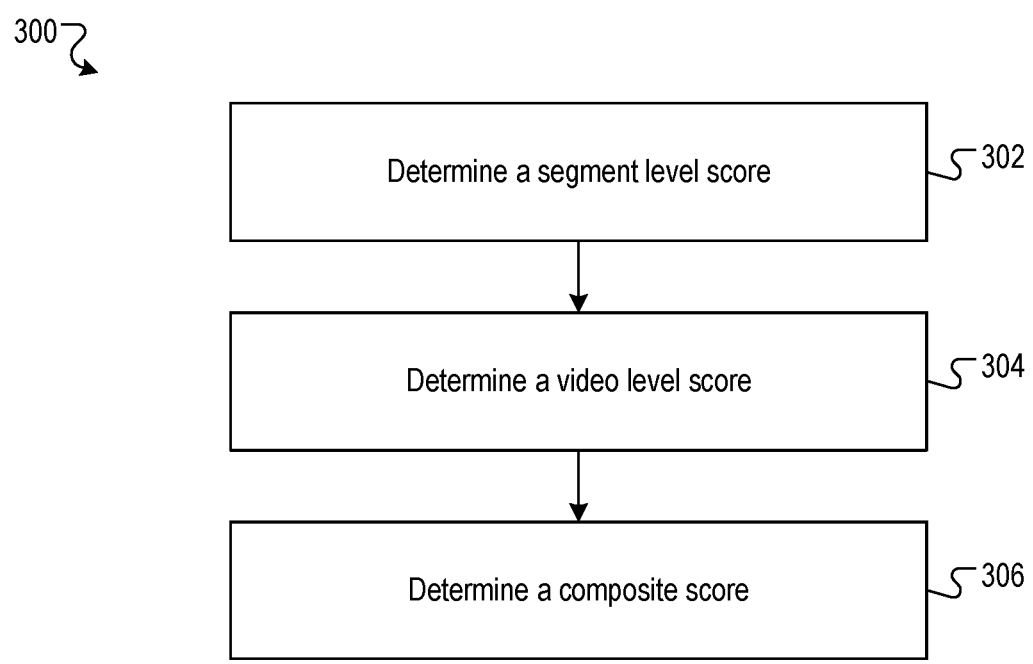
FIG. 3 is a flow diagram of an example process for determining a composite score for a video segment.

FIG. 3 is a flow diagram of an example process for determining a composite score for a video segment. For convenience, the process 300 will be described as being performed by an engine including one or more computers located in one or more locations. For example, a scoring engine, e.g., the scoring engine 112 of FIG. 1, appropriately programmed in accordance with this specification, can perform the process 300.

The engine determines a segment level score for the video segment (302). In general, the segment level score for a video segment is determined based on properties of the video segment. In some implementations, the segment level score for a video segment is determined based only on properties of the video segment to the exclusion of properties of other video segments of the video from which the video segment is extracted.

In some implementations, the segment level score of a video segment is determined based on at least a visual quality score of the video segment. The visual quality score of the video segment may be determined based factors such as blurriness of the video segment and/or camera stability of the video segment.

In some implementations, the segment level score of a video segment is determined based on at least a probability that the video segment is a slideshow. Generally, a slideshow is a video (or video segment) that is characterized by predictable pixel motion between video frames sampled at regular time intervals (e.g., every >1 second). For example, a video showing a series of static images (potentially for a duration of >1 second per static image), with transitions between the static images and overlaid by minor animations, may be considered to be a slideshow. Determining a probability that a video segment is a slideshow is described with reference to FIG. 4.

In some implementations, the segment level score of the video segment is determined based on at least a relevance score of the video segment that is a measure of the relevance of the video segment to the topics. Any appropriate automated method, including image and video processing methods based on machine learning algorithms, can be applied to determine the relevance score of the video segment. Determining the relevance score of the video segment may include determining a respective relevance of each frame of the video segment to the topics and combining the respective relevance of each frame of the video segment (e.g., by summing or averaging).

The segment level score of the video segment may be computed by combining factors including one or more of the visual quality score of the video segment, the probability that the video segment is a slideshow, and the relevance score of the video segment. Each of the factors may be normalized to a fixed scale, and combining the factors may involve combining the factors in accordance with a weighted linear combination. In general, the system may combine the factors in any appropriate manner, including, for example, by combining the factors in accordance with a non-linear function.

The engine determines a video level score for the video segment (304). In some implementations, the video level score for a video segment is determined based on properties of the entire video from which the video segment was extracted that are independent of the particular properties of the video segment.

In some implementations, the video level score of the video segment is determined based on at least a search results score of the video from which the video segment was extracted. In some implementations, if the video was identified based on a particular search using a search engine (e.g., where the search query was given by one of the topics), the search results score of the video may be determined based on at least the search results ranking of the video in the particular search. The ranking of the video in the search results refers to the position occupied by the video in the ordered sequence of search results. In some implementations, the search results score of the video may be determined based on at least an internal score determined by the search engine for the video, where the internal score is used to determine the search results ranking of the video.

In some implementations, the video level score of the video segment is determined based on at least a resolution of the video from which the video segment was extracted. The resolution of the video from which the video segment was extracted can be measured in any appropriate way, and is typically related to the number of pixels in each frame of the video.

The video level score of the video segment may be computed by combining factors including one or more of the search results score of the video from which the video segmented was extracted and the resolution of the video from which the video segment was extracted. Each of the factors may be normalized to a fixed scale, and combining the factors may involve combining the factors in accordance with a weighted linear combination. In general, the system may combine the factors in any appropriate manner, including, for example, by combining the factors in accordance with a non-linear function.

The engine determines a composite score of the video segment (306). In general, the engine determines the composite score of the video segment by combining the segment level score of the video segment and the video level score of the video segment. In some implementations, the engine determines the composite score of the video by combining the segment level score of the video segment and the video level score of the video segment in accordance with a weighted linear combination. In general, the engine can determine the composite score of the video by combining the segment level score and the video level score in any appropriate manner, including, for example, by combining the segment level score and the video level score in accordance with a non-linear function.

Figure 4:
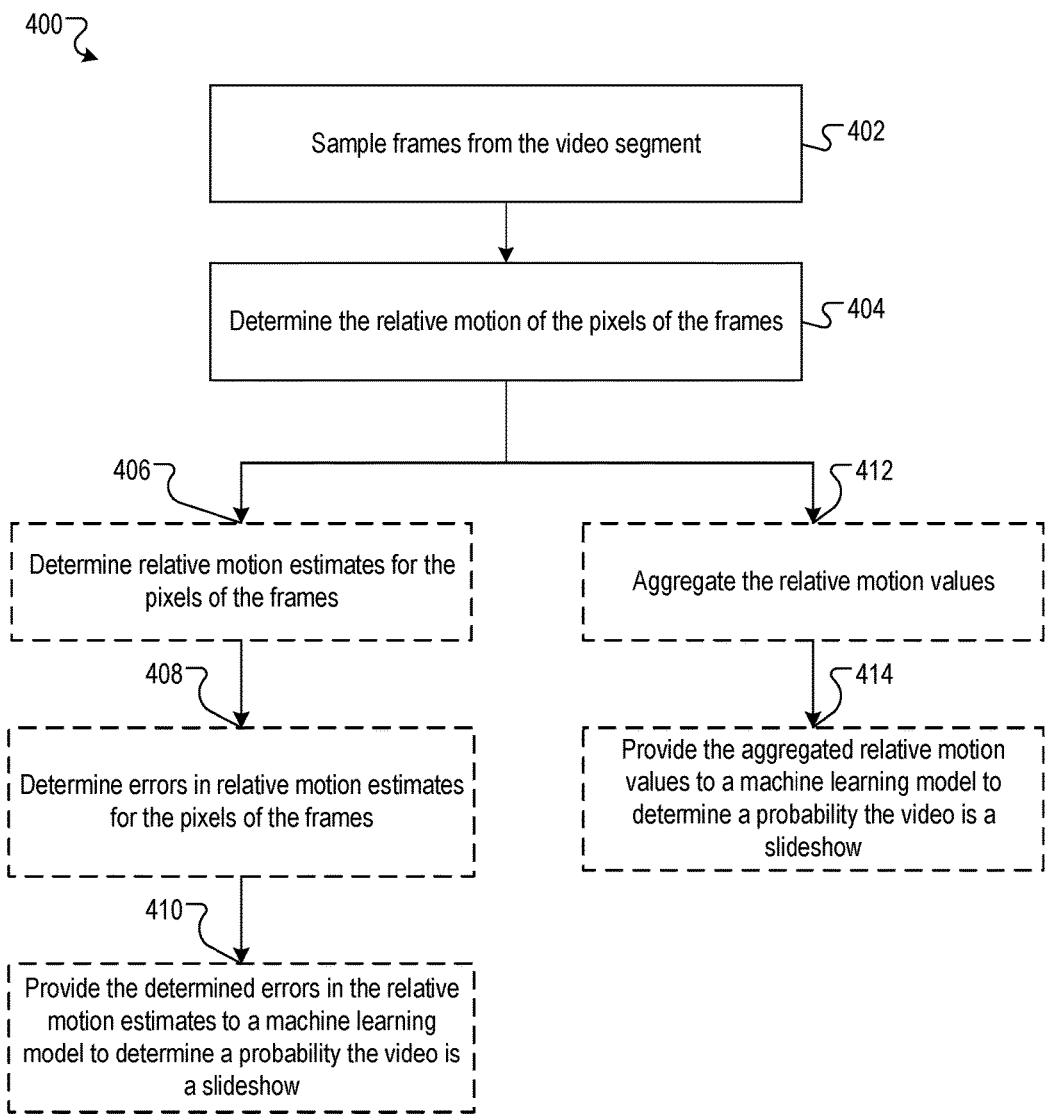
FIG. 4 is a flow diagram of an example process for determining a probability that a video segment is a slideshow.

FIG. 4 is a flow diagram of an example process for determining a probability that a video segment is a slideshow. For convenience, the process 400 will be described as being performed by an engine including one or more computers located in one or more locations. For example, a scoring engine, e.g., the scoring engine 112 of FIG. 1, appropriately programmed in accordance with this specification, can perform the process 400.

The engine samples multiple video frames from the video segment (402). In general, the video frames are sampled from the video segment at regular time intervals (e.g., every 1 second). The number of frames between each sampled frame depends on the frame rate of the video from which the video segment is extracted.

The engine determines the relative motion of pixels in the sampled video frames (404). In some implementations, the relative motion of a pixel can be represented by a vector, where the direction of the vector represents the direction of the relative motion of the pixel, and the magnitude of the vector represents the speed of the relative motion of the pixel. In some implementations, the engine determines the relative motion of the pixels using a numerical method. For example, the engine may determine the relative motion of the pixels using optical flow methods.

The process described by 406, 408, and 410 is a first example process for determining a probability that a video segment is a slideshow.

In some implementations, the engine determines relative motion estimates for the pixels of the sampled frames (406). For example, the relative motion of a pixel of a given frame may be estimated (e.g., by linear interpolation) based on the relative motion of the same pixel in multiple previous frames.

In some implementations, the engine determines errors in the relative motion estimates for the pixels of the sampled frames (408). Specifically, the engine determines a difference between the determined relative motion of the pixels (e.g., determined in 404) and the estimated relative motion of the pixels (e.g., estimated in 406). In some implementations, the engine determines the difference as a norm of a difference between the estimated relative motion of the pixels and the determined relative motion of the pixels.

In some implementations, the engine provides the determined errors in the relative motion estimates as input to a machine learning model that is configured to process the input to generate as output a predicted probability that the video segment is a slideshow. The machine learning model may be trained based on training data including relative pixel motion estimate errors extracted from multiple different video segments, where each of the multiple different video segments is associated with a label indicating whether the video segment is a slideshow (e.g., as determined by a human rater). The machine learning model may be a random forest, a support vector machine (SVM), a neural network, or any other appropriate machine learning model. Generally, video segments where pixel motion can be accurately estimated (i.e., estimated with low error) based on pixel motion in previous frames may be more likely to be slideshows than video segments where the pixel motion cannot be accurately estimated based on pixel motion in previous frames.

The process described by 412 and 414 is a second example process for determining a probability that a video segment is a slideshow.

In some implementations, the engine aggregates the determined relative motion values for the sampled frames of the video segment (412). For example, the engine may partition the sampled frames into different time windows, and aggregate the relative motion values for the sampled frames in a given time window by averaging the relative motion values for the sampled frames in the time window.

In some implementations, the engine provides the aggregated relative motion values for the different time windows as input to a machine learning model that is configured to process the input to generate as output a predicted probability that the video segment is a slideshow (414). For example, the machine learning model may be configured to process the aggregated relative motion values for each of the different time windows to generate respective outputs indicating a predicted probability that the video segment is a slideshow. The engine may combine the multiple respective probabilities output by the machine learning model (e.g., by averaging) to generate a final predicted probability that the video segment is a slideshow. The machine learning model may be trained based on training data including aggregated relative motion values for sampled video frames extracted from multiple different video segments, where each of the multiple different video segments is associated with a label indicating whether the video segment is a slideshow (e.g., as determined by a human rater). The machine learning model may be a random forest, a support vector machine (SVM), a neural network, or any other appropriate machine learning model.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
identifying one or more topics for generation of a synthesis video;
identifying videos, wherein each identified video is determined to be relevant to one or more of the identified topics;
extracting video segments from one or more of the identified videos, wherein each video segment is a proper subset of a video from which the video segment is extracted;
for each of the video segments:
determining a segment level score for the video segment, wherein the segment level score is determined based on properties of the video segment;
determining a video level score for the video segment, wherein the video level score is determined based on properties of the video from which the video segment was extracted;
combining the segment level score and the video level score to determine a composite score for the video segment;
selecting video segments for inclusion in the synthesis video based on the composite scores for the video segments;
generating the synthesis video by combining the selected video segments.

2. The method of claim 1, wherein selecting the video segments includes an optimization procedure, comprising:
generating sets of two or more of the video segments; and
for each set of video segments, generating a cumulative measure of composite score based on the composite scores of the video segments that belong to the set of the video segments.

3. The method of claim 2, wherein the optimization procedure comprises selecting a set of video segments according to a set of constraints, the constraints including one or more of:
a maximum duration constraint, specifying an upper bound on a sum of durations of the selected set of video segments;
a diversity constraint, specifying an upper bound on how many of the selected set of video segments are relevant to any particular identified topic.

4. The method of claim 1, wherein extracting a video segment from a video comprises:
processing frames of the video to determine a relevance of each frame of the video to each of the identified topics;
identifying sequences of consecutive frames that are each relevant to an identified topic.

5. The method of claim 1, wherein identifying one or more topics comprises:
receiving one or more first topics; and
identifying one or more second topics, wherein each identified second topic is determined to be related to one or more of the first topics.

6. The method of claim 5, wherein a second topic is determined to be related to a first topic based on at least a frequency of search queries including the first topic and the second topic.

7. The method of claim 5, wherein a second topic is determined to be related to a first topic based on at least a frequency that the first topic and the second topic jointly appear on web pages.

8. The method of claim 1, wherein the segment level score of a video segment is determined based on at least one or more of:
a visual quality score of the video segment;
a probability that the video segment is a slideshow; and
a relevance score of the video segment to an identified topic.

9. The method of claim 8, wherein the probability that the video segment is a slideshow is determined based on:
extracting motion features of the video segment;
providing the extracted motion features to a machine learning model that processes the extracted motion features to generate a probability that the video segment is a slideshow.

10. The method of claim 9, wherein the motion features of the video segment are optical flow features.

11. The method of claim 1, wherein the video level score of a video segment is determined based on at least one or more of:
a search results score of the video from which the video segment was extracted;
a resolution of the video from which the video segment was extracted.

12. The method of claim 1, further comprising determining that each of the identified topics is associated with a popularity score that is at least as great as a minimum significance threshold.

13. The method of claim 12, wherein the popularity score of a topic is determined based on a frequency of search queries including the topic.

14. The method of claim 1, wherein:
the identified topics are relevant to a search query; and
the generated synthesis video is displayed on a search results page.

15. The method of claim 1, wherein combining the segment level score and the video level score to determine a composite score for the video segment comprises:
combining the segment level score and the video level score by a weighted linear combination.

16. A system, comprising:
a data processing apparatus; and
a non-transitory computer readable storage medium in data communication with the data processing apparatus storing instructions executable by the data processing apparatus and that upon such execution causes the data processing apparatus to perform operations comprising:
identifying one or more topics for generation of a synthesis video;
identifying videos, wherein each identified video is determined to be relevant to one or more of the identified topics;
extracting video segments from one or more of the identified videos, wherein each video segment is a proper subset of a video from which the video segment is extracted;

for each of the video segments:
: determining a segment level score for the video segment, wherein the segment level score is determined based on properties of the video segment;
: determining a video level score for the video segment, wherein the video level score is determined based on properties of the video from which the video segment was extracted;
: combining the segment level score and the video level score to determine a composite score for the video segment;

selecting video segments for inclusion in the synthesis video based on the composite scores for the video segments;

generating the synthesis video by combining the selected video segments.

17. The system of claim 16, wherein selecting the video segments includes an optimization procedure, comprising:
generating sets of two or more of the video segments; and
for each set of video segments, generating a cumulative measure of composite score based on the composite scores of the video segments that belong to the set of the video segments.

18. The system of claim 17, wherein the optimization procedure comprises selecting a set of video segments according to a set of constraints, the constraints including one or more of:
a maximum duration constraint, specifying an upper bound on a sum of durations of the selected set of video segments;
a diversity constraint, specifying an upper bound on how many of the selected set of video segments are relevant to any particular identified topic.

19. The system of claim 16, wherein extracting a video segment from a video comprises:
processing frames of the video to determine a relevance of each frame of the video to each of the identified topics;
identifying sequences of consecutive frames that are each relevant to an identified topic.

20. A non-transitory computer readable storage medium storing instructions executable by a data processing apparatus and that upon such execution causes the data processing apparatus to perform operations comprising:
identifying one or more topics for generation of a synthesis video;
identifying videos, wherein each identified video is determined to be relevant to one or more of the identified topics;
extracting video segments from one or more of the identified videos, wherein each video segment is a proper subset of a video from which the video segment is extracted;
for each of the video segments:
: determining a segment level score for the video segment, wherein the segment level score is determined based on properties of the video segment;
: determining a video level score for the video segment, wherein the video level score is determined based on properties of the video from which the video segment was extracted;
: combining the segment level score and the video level score to determine a composite score for the video segment;

selecting video segments for inclusion in the synthesis video based on the composite scores for the video segments;

generating the synthesis video by combining the selected video segments.

* * * * *